(12) United States Patent
Spruce et al.

(10) Patent No.: US 9,217,416 B2
(45) Date of Patent: Dec. 22, 2015

(54) WIND TURBINE HAVING A CONTROL METHOD AND CONTROLLER FOR PERFORMING PREDICTIVE CONTROL OF A WIND TURBINE GENERATOR

(75) Inventors: Christopher Spruce, Leatherhead (GB); Robert Bowyer, Fulham (GB); Justin Creaby, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 854 days.

(21) Appl. No.: 13/517,966
(22) PCT Filed: May 31, 2010
(86) PCT No.: PCT/EP2010/003296
§ 371 (c)(1), (2), (4) Date: Jan. 2, 2013
(87) PCT Pub. No.: WO2011/076295
PCT Pub. Date: Jun. 30, 2011

(65) Prior Publication Data
US 2013/0106107 A1    May 2, 2013

Related U.S. Application Data

(60) Provisional application No. 61/288,628, filed on Dec. 21, 2009.

(30) Foreign Application Priority Data

Dec. 21, 2009 (GB) .................................. 0922385.0

(51) Int. Cl.
*G05D 3/12* (2006.01)
*G05D 17/00* (2006.01)
(Continued)

(52) U.S. Cl.
CPC .............. *F03D 9/002* (2013.01); *F03D 7/0224* (2013.01); *F03D 7/0272* (2013.01); *F03D 7/045* (2013.01);
(Continued)

(58) Field of Classification Search
CPC ........... F05B 2260/82; F05B 2260/821; F05B 2270/1016; F05B 2270/20; F05B 2270/32; F05B 2270/321; F05B 2270/332; F05B 2270/404; F05B 2270/8042; F05B 2270/805; F03D 7/022; F03D 7/0224; F03D 7/028; F03D 7/0292; F03D 7/045; F03D 7/046; F03D 7/048; F03D 9/005; Y02E 10/723; Y02E 10/725; Y02E 10/763; G06Q 10/04; G06Q 50/06; Y04S 10/54; H02J 3/386; H02P 9/00; H02P 2101/15

USPC ................ 700/286, 287, 291; 705/7.11, 7.29, 705/7.35, 400, 412, 413; 290/7, 43, 44, 55; 322/35

See application file for complete search history.

(56) References Cited

U.S. PATENT DOCUMENTS 5,289,041 A     2/1994   Holley
6,320,272 B1   11/2001   Lading et al.
(Continued)

FOREIGN PATENT DOCUMENTS

EP     1770278     4/2007
EP     1911968     4/2008
(Continued)

OTHER PUBLICATIONS

A. Kusiak et al., Anticipatory Control of Wind turbines With Data-Driven Predictive Models, IEEE Transactions on Energy Conversion, vol. 24, Issue 3, pp. 766-774, Sep. 1, 2009, IEEE, Piscataway, NJ, US.

(Continued)

*Primary Examiner* — Crystal J Barnes-Bullock
(74) *Attorney, Agent, or Firm* — Patterson + Sheridan, LLP

(57) ABSTRACT

The application describes a wind turbine having a control method and controller for performing predictive control of a wind turbine generator. Based on the measured instantaneous wind speed, it is known to provide control signals to a wind turbine in order to control the pitch of the wind turbine rotor blades and the speed of the generator. However, it is difficult using instantaneous wind speed measurements to achieve smooth control, due to finite response speeds of the associated electro-mechanical systems, as well as the constantly changing control system inputs. The predictive control system described in the application assumes a model of generator speed based on the values of the incident wind speed $v(t)$ and the values of a control signal $u(t)$ output to the wind turbine in a feed forward loop. Here, the control signal can be for one or more of controlling either the power setting of the generator, or the pitch angle of the rotor blades. The predictive controller uses a rolling time series of values for $v(t)$ and $u(t)$ and based on a predicted response of the generator speed $w(t)$ optimizes the time series control signal $u(t)$. The predicted response of the generator speed $w(t)$ is based on model, that can be refined in real time as the wind turbine operates.

22 Claims, 8 Drawing Sheets

(51) Int. Cl.
*G06Q 30/00* (2012.01)
*G06F 17/00* (2006.01)
*F03D 9/00* (2006.01)
*H02P 9/00* (2006.01)
*F03D 7/02* (2006.01)
*F03D 7/04* (2006.01)
*G05B 13/04* (2006.01)

(52) U.S. Cl.
CPC ......... *G05B 13/048* (2013.01); *F05B 2260/821* (2013.01); *F05B 2270/20* (2013.01); *F05B 2270/32* (2013.01); *F05B 2270/404* (2013.01); *Y02E 10/723* (2013.01)

(56) References Cited

U.S. PATENT DOCUMENTS

| | | | | |
|---|---|---|---|---|
| 6,666,410 | B2* | 12/2003 | Boelitz et al. | 244/171.1 |
| 8,649,911 | B2* | 2/2014 | Avagliano et al. | 700/291 |
| 8,884,578 | B2* | 11/2014 | Pandy et al. | 320/101 |
| 9,097,236 | B2* | 8/2015 | Zhou et al. | 1/1 |
| 2003/0160457 | A1 | 8/2003 | Ragwitz et al. | |
| 2006/0140764 | A1 | 6/2006 | Smith et al. | |
| 2007/0067067 | A1 | 3/2007 | Stommel | |
| 2009/0224542 | A1 | 9/2009 | Nim | |
| 2014/0244328 | A1* | 8/2014 | Zhou et al. | 705/7.13 |
| 2015/0152847 | A1* | 6/2015 | Guadayol Roig | 290/44 |

FOREIGN PATENT DOCUMENTS

| | | |
|---|---|---|
| EP | 2025929 A2 | 2/2009 |
| EP | 2110551 | 10/2009 |
| JP | 2006125265 A | 5/2006 |
| JP | 2008 064081 | 3/2008 |
| WO | 2004077068 A1 | 9/2004 |
| WO | 2007045940 A1 | 4/2007 |
| WO | 2011076818 A2 | 6/2011 |
| WO | 2011076875 A2 | 6/2011 |

OTHER PUBLICATIONS

International Search Report dated Oct. 20, 2011 for PCT/EP2010/003296.

UK Examination Report Under Section 18(4) for Application No. GB0922385.0, May 28, 2014.

International Search Report dated Oct. 20, 2011 for PCT/EP2010/070553.

International Search Report dated Oct. 20, 2011 for PCT/EP2010/070443.

* cited by examiner

WIND TURBINE HAVING A CONTROL METHOD AND CONTROLLER FOR PERFORMING PREDICTIVE CONTROL OF A WIND TURBINE GENERATOR

CROSS-REFERENCE TO RELATED APPLICATIONS

This application is a National Stage Entry of International Application No. PCT/EP10/03296, filed May 31, 2010, which claim priority to United Kingdom Application No. 0922385.0, filed Dec. 21, 2009, and which also claims the benefit of U.S. Provisional Application No. 61/288,628, filed Dec. 21, 2009.

FIELD OF THE INVENTION

This invention relates to wind turbines and more specifically to a wind turbine utilising a method of control and/or a controller for performing predictive control of the wind turbine's generator.

BACKGROUND TO THE INVENTION

FIG. 1 illustrates a wind turbine 1, comprising a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a low speed shaft (not shown) extending from the nacelle front. The wind turbine illustrated in FIG. 1 may be a small model intended for domestic or light utility usage, or for example may be a large model, such as those that are suitable for use in large scale electricity generation on a wind farm. In the latter case, the diameter of the rotor may be as large as 100 meters or more.

When selecting a wind turbine for a given operating location, consideration is given to the characteristics of the site such as the complexities of the site terrain and the average wind conditions. The turbine chosen can ideally operate at rated power for as much of the time as possible. However, in practice, wind speeds are variable and the turbine must be able to cope with a wide variety of wind speeds. At lower wind speeds the power output will either be zero, if there is negligible wind, or below rated power. Once the wind speed increases to above that required for rated power the turbine will protect itself from damage, for example, by varying the pitch of the blades to reduce the power extracted from the wind. In extreme cases the turbine may shut down or yaw out the wind to prevent catastrophic damage.

When adjusting the pitch angle to compensate for changes in wind speed measured at the wind turbine, there is an inevitable time delay between the detection of the instantaneous wind speed detection and the blades being brought into the correct pitch position. It is therefore known to control the pitch of the wind turbine based on the future expected wind speed measured using a LIDAR apparatus.

The use of LIDAR to control operation of wind turbines is known, for example, from U.S. Pat. No. 6,320,272 of Lading et al, which teaches the use of a laser wind velocity measurement system such as a LIDAR (Light Detection and Ranging) apparatus mounted on the nacelle. LIDAR operates by emitting a laser beam in front of the wind turbine to measure the conditions at a distance in front of the wind turbine. The distance is typically arranged to be between 0.5 and 3 rotor diameters away from the turbine, which is therefore in the order of 50 to 300 m for a large modern wind turbine. LIDAR operates in known manner either by detecting air molecules or by detecting particles entrained in the air stream and calculating information about the air flow from these measurements. This information may include wind speed and direction and wind shear in the vertical and horizontal directions although the parameters that can be calculated will depend on the complexity of the LIDAR used. The pitch angle can then be adjusted in advance of changes in wind speed and the operation of the wind turbine can subsequently be made more efficient.

However, adjustment of rotor blade pitch based on measurements of the future value of the wind can lead to other operational difficulties, such as how control based on those variables is to be performed in real time for a wind turbine generator. In this regard, we have appreciated that there is a need for an improved control technique.

Furthermore, real time control of the wind turbine to adjust mechanical or electrical control parameters can lead to increased wear and tear on the control actuator system if the control is not performed properly. We have also appreciated that control of the wind turbine based on the predicted value of future parameters can be used to offer a more reliable and more responsive control system.

SUMMARY OF THE INVENTION

In a preferred aspect, the invention provides, a wind turbine comprising: one or more rotor blades; a pitch actuator system for adjusting the pitch angle of the one or more wind turbine rotor blades; a generator; a wind sensor for detecting the incident wind speed at at least a position that is a predetermined distance in front of the one or more rotor blades; and a controller coupled to the wind sensor for providing an output control signal for the wind turbine, wherein the controller is arranged to: a) receive values from the wind sensor indicating the incident wind speed at a predetermined distance in front of the wind turbine; b) generate a time series representation of the incident wind speed for a future time period; c) postulate a time series of values for an output control signal for a future time period; d) optimise the time series of values for the output control signal based on minimising a cost function, wherein the cost function includes terms defining aspects of the operation of the wind turbine; and e) output a control signal based on the time series of values optimised in step d). The control process provided by the cost function and optimisation of the control signal allows the wind turbine to be controlled efficiently and smoothly, reducing operational wear and tear and prolonging the life of the electro and mechanical components.

In one embodiment, the output control signal is a blade pitch reference signal output to the pitch actuation system. In a further embodiment, the output control signal may solely or also comprise a generator power reference output to the generator.

Advantageously, the cost function contains a term representing the difference between a time series representation of the required speed of the generator, and a future time series representation of the predicted generator speed. Thus, the operation of the generator can be mapped into the future and control can be managed over an extended period of time, without the need for sudden reactive control steps.

The time series representation of the predicted generator speed can be calculated based on the time series representation of the incident wind speed for a future time period, and the time series values of the control signal. Advantageously, the cost function contains a term representing the extent to which changes in the value of the control signal are permitted.

Thus, variations in the control signal can be minimised resulting in smoother control of the system.

In one embodiment, the controller is arranged to receive one or more optimal reference values for the control signal, based on a measured wind speed at the wind turbine. Advantageously, the cost function contains a term representing the extent to which the time series of values for the output control signal once optimised are permitted to differ from the optimal values assuming steady state wind speed. This ensures that the operation of the wind turbine can be maintained within a required tolerance of the optimal values, yet with a degree of flexibility in tracking.

Preferably, the wind sensor is a doppler anemometer.

A corresponding method, apparatus and computer program are also provided.

BRIEF DESCRIPTION OF THE DRAWINGS

Embodiments of the invention will now be described, by way of example only, and with reference to the accompanying drawings, in which.

DETAILED DESCRIPTION OF THE PREFERRED EMBODIMENTS

The invention generally relates to a method and apparatus for performing predictive control of a wind turbine generator. It is known to provide control signals to a wind turbine in order to control the pitch of the wind turbine rotor blades and the speed of the generator based on the measured instantaneous wind speed. However, it is difficult using instantaneous wind speed measurements to achieve smooth control, due to finite response speeds of the associated electro-mechanical systems, as well as the constantly changing control system inputs. The predictive control system described here assumes a model of generator speed based on the values of the incident wind speed $v(t)$ and the values of a control signal $u(t)$ output to the wind turbine in a feed forward loop. Here, the control signal can be for one or more of controlling either the power setting of the generator, or the pitch angle of the rotor blades. The predictive controller uses a rolling time series of values for $v(t)$ and $u(t)$ and based on a predicted response of the generator speed $w(t)$ optimises the time series control signal $u(t)$. This may be done across the entire time series $u(t)$ corresponding in length and time to $v(t)$. In practice, however, it is preferred only to optimise $u(t)$ for a few values into the future so that the optimisation can be completed more quickly. Assuming a time series of 30 values for v, optimising up to five values of u has been found to work in practice. The predicted response of the generator speed $w(t)$ is based on a model, that can be refined in real time as the wind turbine operates.

Figure 1:
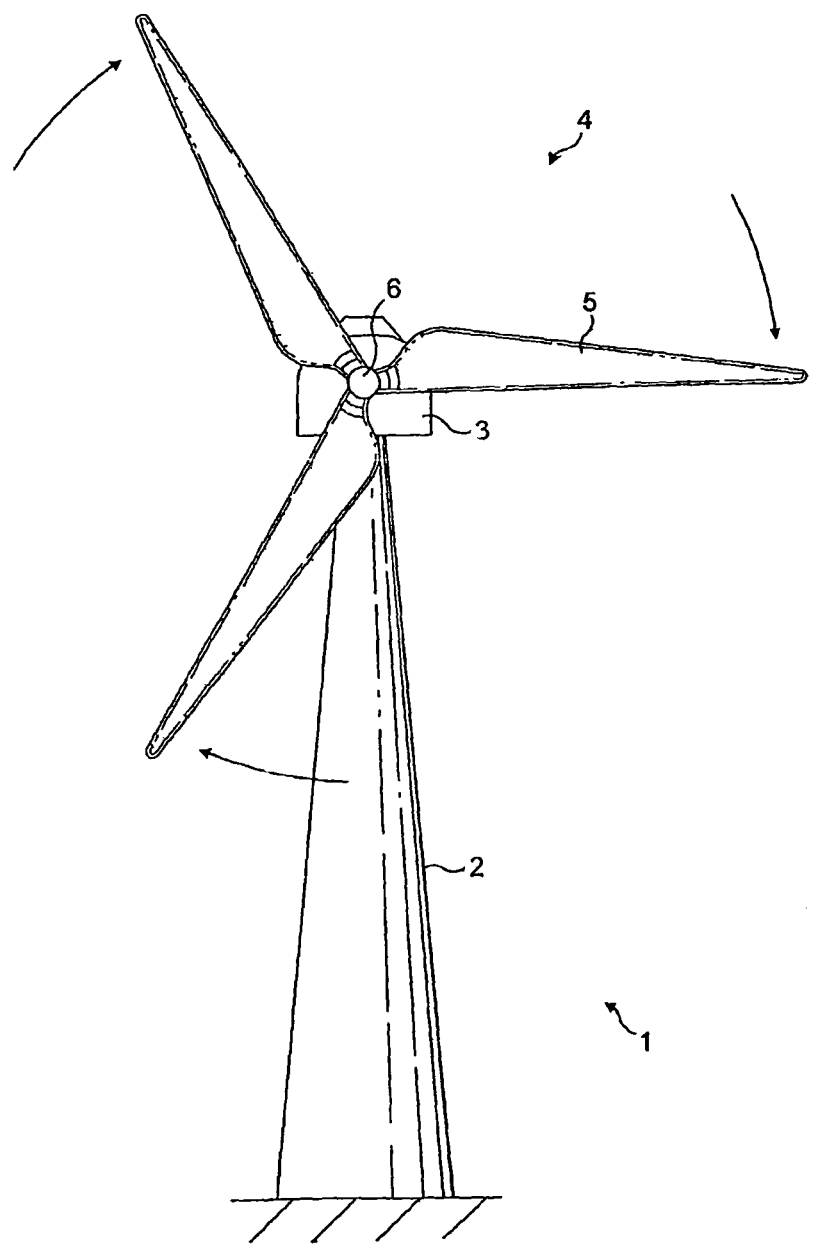
FIG. 1 is a front view of a horizontal axis wind turbine.
Figure 2:
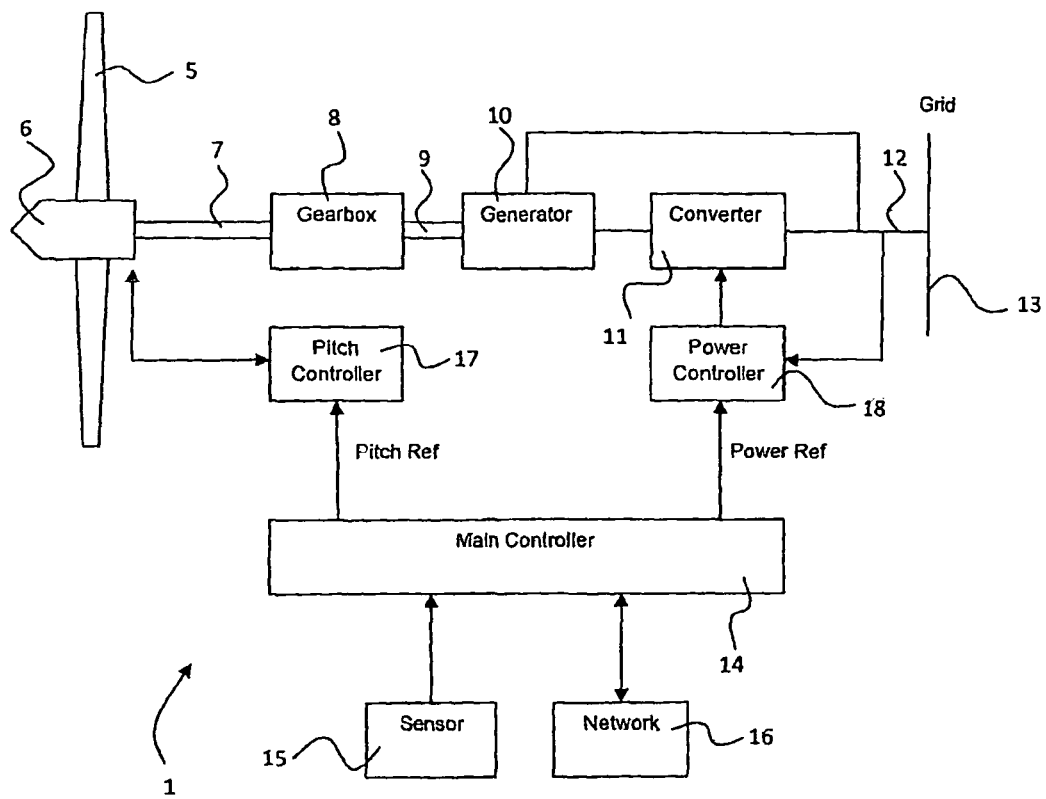
FIG. 2 is a schematic side view of the wind turbine of FIG. 1 showing the components housed in the nacelle.

FIG. 2, to which reference should now be made, is a schematic illustration showing components located in the interior of the nacelle 3 for the wind turbine shown in FIG. 1. The rotor hub 6 connects at the front of the nacelle 3 to a main drive shaft 7 which is received in a gearbox 8. The gearbox 8 is, in turn, connected to shaft 9 linked to an electrical generator 10. The generator 10 provides an electrical output which is passed to an electrical frequency converter 11 and subsequently to an output 12 for connection to the grid or local utility 13.

The turbine 1 has a main controller 14 connected to sensor equipment 15, such as an anemometer or LIDAR. The anemometer housed on the wind turbine nacelle 3 can be used to measure the instantaneous wind speed at the wind turbine. A LIDAR apparatus on the other hand can be used to measure the wind speed at the wind turbine or more typically some distance in front of the wind turbine in the path of the oncoming wind. In this regard, the LIDAR can be thought of as measuring the future wind speed encountered at the wind turbine. In the case of wind turbines connected to a wind park or to the grid, the main controller is also typically connected to a monitoring and control network 16. By means of the network 16, the main controller 14 can receive updates to its control information and operational set points, as well as download reports of operating status for monitoring purposes and fault detection.

The main controller provides a separate pitch reference output to pitch actuator apparatus 17 and a power reference output to power control apparatus 18. These are calculated based on internal control algorithms in the main controller and the information received from the sensor 15 and network 16.

The pitch reference value is the angle that the rotor blades are required to make with respect to the incident wind, and the value is adjusted to reflect changes in incident wind speed. The pitch angle of the blades affects the tip speed of the rotating turbine blades, and it is the role of the pitch actuator apparatus 17 to constantly control the blades according to the pitch angle received from the controller. The constant adjustment in the pitch angle rotor blades ensures that either optimal power is generated by the wind turbine or that when the wind speed is too high the wind turbine can be derated to enter a safe mode.

The power controller 18 receives an input signal from the output 12 of the wind turbine as well as receiving the power reference from the main controller 14. In synchronous generators, the role of the power controller 18 is to ensure that the frequency of the alternating current output by the generator is within the desired range for feeding to the grid. The power controller 18 provides an output to the electrical converter, which through adjustment of the frequency of the rotor current in the generator's rotor circuit allows the generator speed to be varied. Here, generator speed is typically understood to be the speed of the generator rotor. The power controller adjusts the power reference according to grid frequency. Although, the power of the wind turbine is normally directly connected to the wind speed, the power may also be deliberately lowered by an external power reference transmitted from the main controller 14. When the power is lowered by an external power reference, the turbine is said to be derated.

Figure 3:
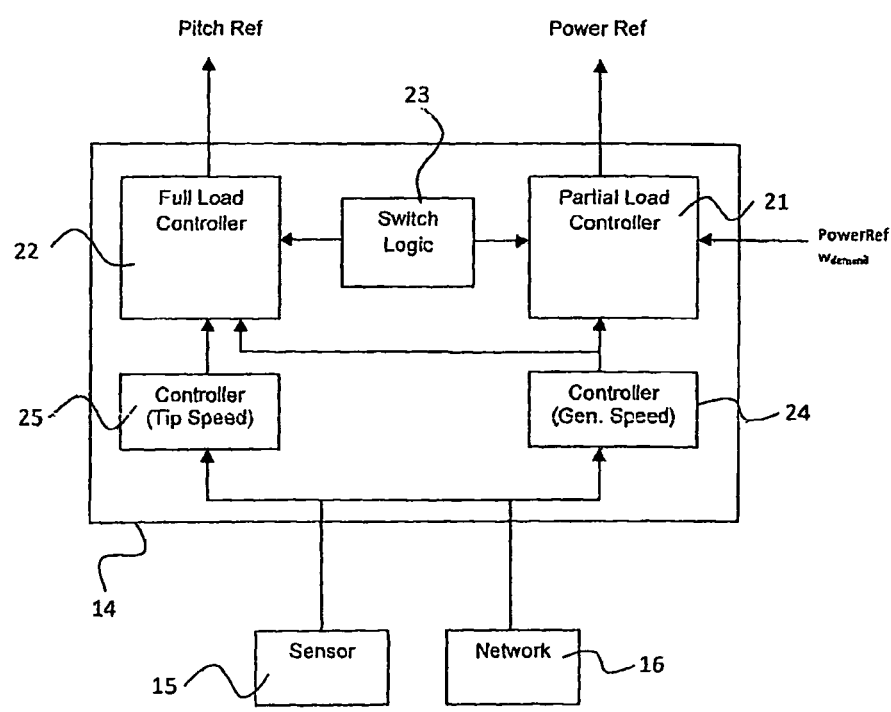
FIG. 3 is a schematic view of the wind turbine main controller shown in FIG. 2.

FIG. 3 illustrates the main controller in more detail. Generally, speaking the role of the main controller is to supervise the operation of the wind turbine and ensure at all times that the amount of energy being produced is maximal, while limiting operational noise and mechanical loads experienced by the device. The main controller 14 includes a Partial Load Controller 21 and a Full Load Controller 22. These operate in respective power regimes to provide appropriate Pitch and Power Reference outputs that either maximise the power produced or derate the wind turbine as required. Switch Logic 23 determines in which of the two regimes the wind turbine is currently operating and switches in the appropriate controllers.

The Partial Load Controller 21 operates when the wind speed is not sufficient for the wind turbine to generate enough power to meet the required preset power value. In this regime, the pitch of the wind turbine blades is set at an optimal angle to extract as much energy from the wind as possible, while satisfying any given noise restrictions or other operational requirements. The principal output control parameter of the Partial Load Controller is therefore a power reference, by which the speed of the generator can be controlled.

Partial load operation can typically be divided into three ranges:

a) Operation at a low speed limit ($v_{on} \leq v \leq v1$), in which the generator speed (w) in rpm is kept at the lowest possible value. Here $v_{on}$ is the minimum wind speed at which the turbine can operate, and v1 is a first threshold value;

b) Operation at efficiency optimum ($v1 < v \leq v2$) in which the rotor rpm is controlled to be proportional to the wind speed resulting in maximum aerodynamic efficiency of the rotor. In this regime, the pitch angle is kept substantially constant.

c) Operation at nominal rpm ($v2 \leq v \leq v_{rtd}$) in which if the wind speed is higher than v2, the turbine is operated at its rated generator rpm. In practice, however, under the influence of turbulence, the rpm will dynamically fluctuate around the stationary setpoint.

The Full Load Controller 22 is automatically activated by the switch logic 23 as soon as the power output of the wind turbine rises to be equal to the power demand set by the main controller 14. In Full Load Control, the controller 22 adjusts the pitch angle of the wind turbine blades 5 to ensure that that power output of the wind turbine remains at a preset value. The generator rpm (w) is therefore essentially controlled by the pitch reference output used to control the wind turbine blades 5. If the wind is too strong, the pitch angle of the turbine blades is adjusted so that they are tilted out of the wind. Furthermore, in Full Load Control, if the wind speed drops below a preset value, causing the pitch angle to be adjusted to a value close to the optimum pitch angle, the full load controller is deactivated and the partial load controller takes over the control.

If the wind speed is between rated and cut out wind speed, the turbine will normally be in the full load state characterized by the turbine output power being equal to the demanded power. However, under the influence of turbulence, it may also happen that the control system occasionally turns into partial load, although the wind speed is above rated.

The Partial 21 and Full Load Controllers 22 receive as control signal inputs from initial modules 24 and 25 that specify for a given wind speed, the optimal generator speed (w) rpm set point and the optimal pitch set point. These modules directly receive the wind speed output from a wind sensor, such as a LIDAR device or anemometer, and use this value to look up the optimal values u0. The optimal value for the generator speed is passed to the Partial Load Controller 21 and forms the basis of the Power Reference. The optimal value for the pitch control is passed to the Full Load Controller 22 and forms the basis of the pitch reference. In wind turbines produced by the applicant, the initial controllers 24 and 25 are referred to as OptiSpeed and OptiTip respectively.

In a wind turbine control system, it is possible to imagine a scenario in which no predictive control is performed, and the generator speed is simply controlled based on the instantaneous or time t=0 values of u and v, and the difference E between the current generator speed w and the required speed $w_{demand}$. The disadvantage with instantaneous control is that it does not allow for optimal control of the generator due to the inevitable physical delays in response of the mechanical and electrical components of the system, and the difficulties of tracking variables in a real world system where the sensitivity of the response must be tailored to the system and to other factors.

For example, at a steady state wind speed v and in full load control, a value of w that is lower than the required value, $w_{demand}$, will indicate that the pitch angle $u^{pitch}$ should be increased to allow more energy from the incident wind to be extracted. However, as the wind speed is rarely in a steady state, the pitch angle $u^{pitch}$ will also depend on the wind speed v, and not solely on the difference value $\epsilon$. In this case, as the wind speed v varies, the indicated pitch angle $u^{pitch}$ might suddenly be found to be unsuitable, either over-compensating where the wind speed has increased in the intervening period, or under-compensating where the wind speed has subsequently fallen away.

In the next time interval, the result may be a further over compensation, often in the opposite direction, resulting in an oscillation of the control, a phenomenon known as ringing. It can be seen then that if the response of the controller to a change in conditions of v and w is too sensitive, then the result may be a sudden or drastic adjustment to the input parameter u which over compensates for the perceived mismatch in w. In the next time interval, the subsequent adjustment proposed by the controller now has to deal with the both the conditions of w and v, and the overcompensation from the previous step. On the other hand, if the controller is not sensitive enough, then response of the controller to rapid changes in the parameters w and v may not be great enough to ensure that the control is effective. We have therefore appreciated that a predictive control system is required.

While predictive control systems are known, these are typically off-line in the sense that they create an inverse transfer control function based on an instantaneous measurement of wind speed by the LIDAR or anemometer apparatus. We have appreciated that such systems are sub-optimal, as the response of the wind turbine control system will change over time, for example as an actuator wears out or due to changes in atmospheric conditions such as air density, and as a result the calculated control function will no longer apply as closely as expected.

Figure 4:
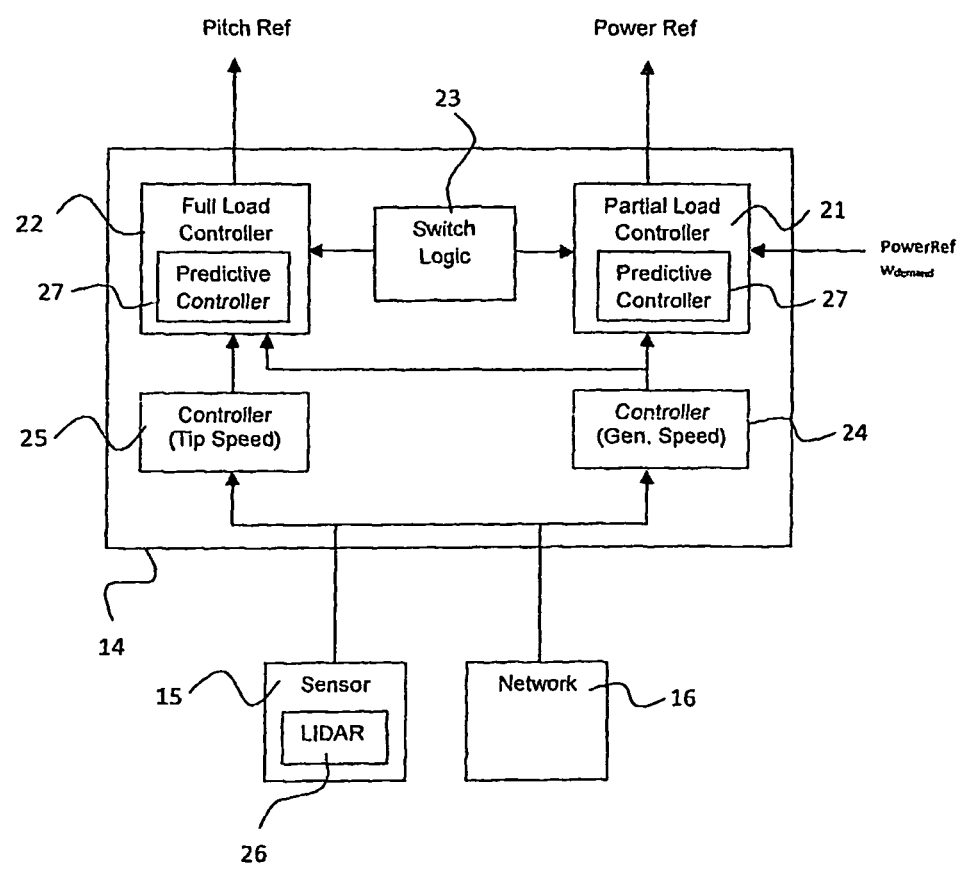
FIG. 4 is a schematic view of the wind turbine main controller according to a first example of the invention.

Reference will now be made to FIG. 4, which schematically illustrates the main controller 14 according to an example of the invention. In this example, the wind turbine is connected to a sensor 15. The sensor 15 includes a LIDAR system 26 which is arranged to detect the incident wind speed in front of the wind turbine, and an optional wind sensor or anemometer for detecting the instantaneous wind speed at the wind turbine. The LIDAR may for example be arranged to detect the wind speed approximately 30 m away from the wind turbine. At an average wind speed of 10 m/s this provides a future time window for the wind speed measurement of approximately 3 s. With reference to FIG. 1, the LIDAR 26 may be mounted on the upper surface of the nacelle 3, on the tower, on the underside of the nacelle, in the rotor hub 6 or even in the blades 5. In the latter case, a separate LIDAR 26 might be mounted in each blade or a single LIDAR in one or two only of the blades. In one example, the LIDAR may be one or more simple staring type unit which sends a single beam upstream of the turbine, and may comprise its own physically separate power supply lines to different power supply sources within the turbine. Further, the LIDAR 26 may measure upstream conditions at a single location upstream or at multiple points at multiple range gates.

The main controller 14 also comprises a Predictive Controller 27, which receives an input directly from both the LIDAR 26, and in similar fashion to FIG. 3, from one or more of the Initial Controllers 24 and 25 that set the optimal instantaneous Power Reference and Pitch Reference for the detected steady state wind speed. As shown in FIG. 4, the predictive controller 27 can operate in conjunction with either of the Partial 21 or Full Load Controller 22, and in this diagram for clarity it is shown as a functional component of each controller. In practice, the predictive controller can replace the Full Load Controller as it performs a substantially identical role. The Predictive Controller 27 providing Full Load Control receives input from both Initial Controllers 24 and 25, whereas the Predictive Control 27 implemented in conjunction with the Partial Load Controller 21 need only receive an input from Initial Controller 24.

Figure 5:
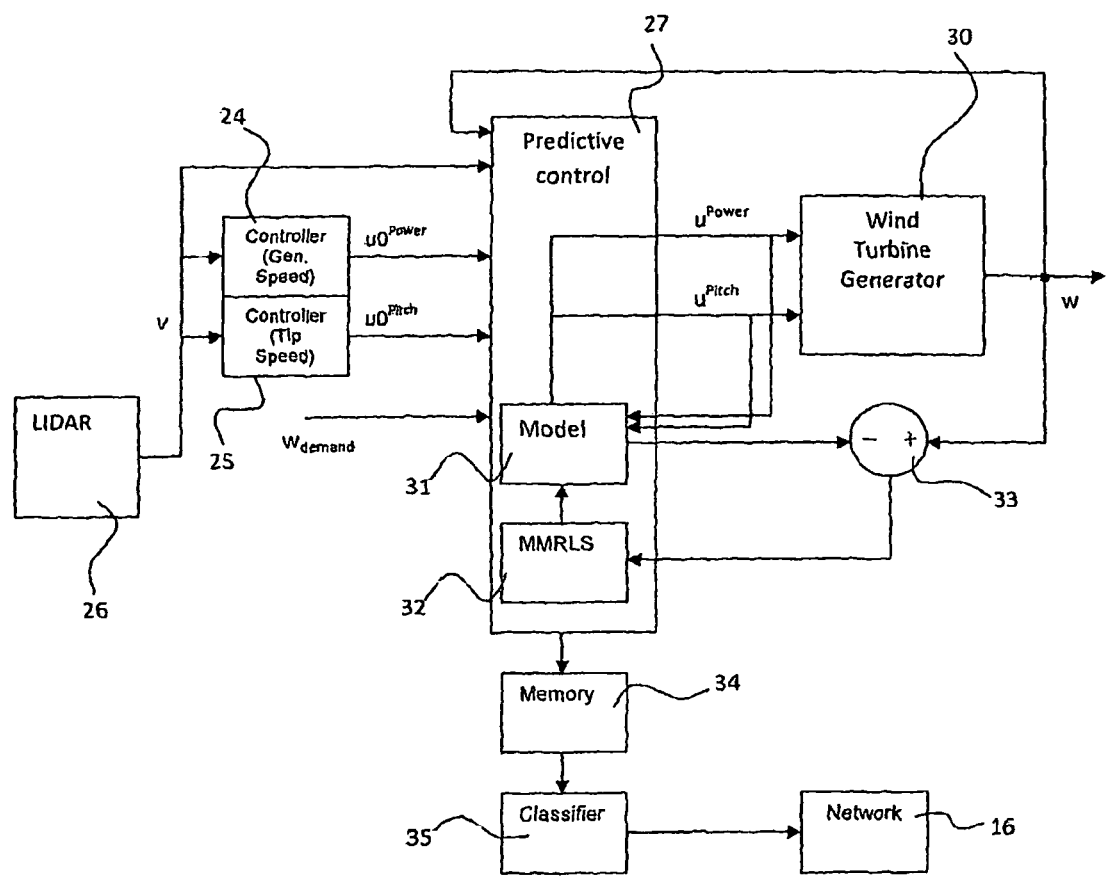
FIG. 5 is a schematic diagram of a predictive control system for a wind turbine generator.

A functional diagram of the predictive controller 27 is shown in FIG. 5 to which reference should now be made. In this diagram, details of the interaction of the Predictive Controller 27, with the other control functions in the main controller 14, such as the Partial 21 and Full Load Controllers 22, have been omitted to avoid obscuring the diagram. As noted above, the operation of the Predictive Controller 27 illustrated in FIG. 5 can in any case carry out Full Load Control without the need for the separate controller 22.

The predictive controller 27 receives an input of wind speed v from the LIDAR apparatus 26, and of wind dependent optimal set points $u0^{power}$ and $u0^{pitch}$ from Initial Controllers 24 and 25. Like the Full and Partial Load controllers described above, the purpose of the predictive controller 27 is to output pitch $u^{pitch}$ and power $u^{power}$ control signals to the wind turbine to achieve optimal control. In this diagram the wind turbine is depicted generally by reference numeral 30. However, the predictive controller 27 differs from the Partial 21 and Full Load Controllers 22 at least in that, rather than calculating instantaneous control values for immediate application to the wind turbine system, it calculates a time series of future control values based on the future wind speed information from the LIDAR 26 and any knowledge of the expected performance of the generator in future. Although only the immediate value in the times series is output for control purposes (that is the values of the parameters at t=0), the generation of the future time series provides a number of advantages, namely a feedback function that allows control of the turbine to be optimised to balance the response speed of the control and the costs of activating the actuator systems. Such costs might be actuator power consumption, wear and tear on the actuators and on turbine components.

It will be appreciated that the LIDAR apparatus provides as an output wind speed values at a location in front of the wind turbine and in the path of the incident wind. Knowing the range of the LIDAR and the wind speed, allows the output value of wind speed to be associated with a time in the future, that is when the wind at the LIDAR measurement location has reached the wind turbine and impinges on the rotor blades. The values of v output by the LIDAR can therefore be represented as a time series v(t) in which each wind speed value is assigned a time label indicating its separation in time from the value of wind experienced by the wind turbine at the current time. Similarly, time series can be generated for the control parameter u, and for the predicted ŵ or required $w_{demand}$ generator speed, and as the wind turbine system is dynamic, to some extent all variables required for control. The notation x(t) is used here where emphasis is required, but otherwise dropped where convenient. Further, as the time series of values in a digital or computerised system is essentially represented by an array of discrete values the time series can also be referred to by the notation x(i). The i notation is therefore used to emphasise individual values in the time series rather than individual times. In one example, a length for the time series of around 3 seconds with a sampling speed of 0.1 s, corresponding to 30 discrete samples, has been found to be sufficient.

The operation of the predictive controller 27 is based on an inherent model 31 mapping the input and output parameters and their relationships to one another. The model used in this example is illustrated schematically in FIG. 6, which will be described in more detail later. It is sufficient here however to note that the model assumes that the generator speed w is a function of two inputs, the wind speed v and the control parameter u, namely $u^{pitch}$ and/or $u^{power}$. The generation of an optimal future time series of control signals is then carried out by the predictive controller based on a cost function analysis of future control parameters according to the model 31.

In one embodiment, the predictive controller 27 includes an adaptive training and control block 32 for updating the model 31, based on errors between the calculated and actual control parameters and expected wind turbine response. A subtractor 33 receives as an output from the wind turbine one or more of the power output and generator speed w. These values are compared or subtracted with predicted generator speed ŵ and fed back to the adaptive training and control block 32 that subsequently updates model 31. This will be explained in more detail later.

To ensure that the instantaneous generator speed w matches the requested generator speed $w_{demand}$, the predictive controller 27 adjusts the input control parameters $u^{pitch}$ and/or $u^{power}$. As noted above, these values will be the current values $u^{pitch}$ and/or $u^{power}$ in a time series of values for $u^{pitch}$ and/or $u^{power}$ calculated at each time instant. To simplify the following discussion a detailed analysis for $u^{pitch}$ will given. It will be appreciated that the inclusion of control based on $u^{power}$ can be achieved following the same principles.

Figure 7:
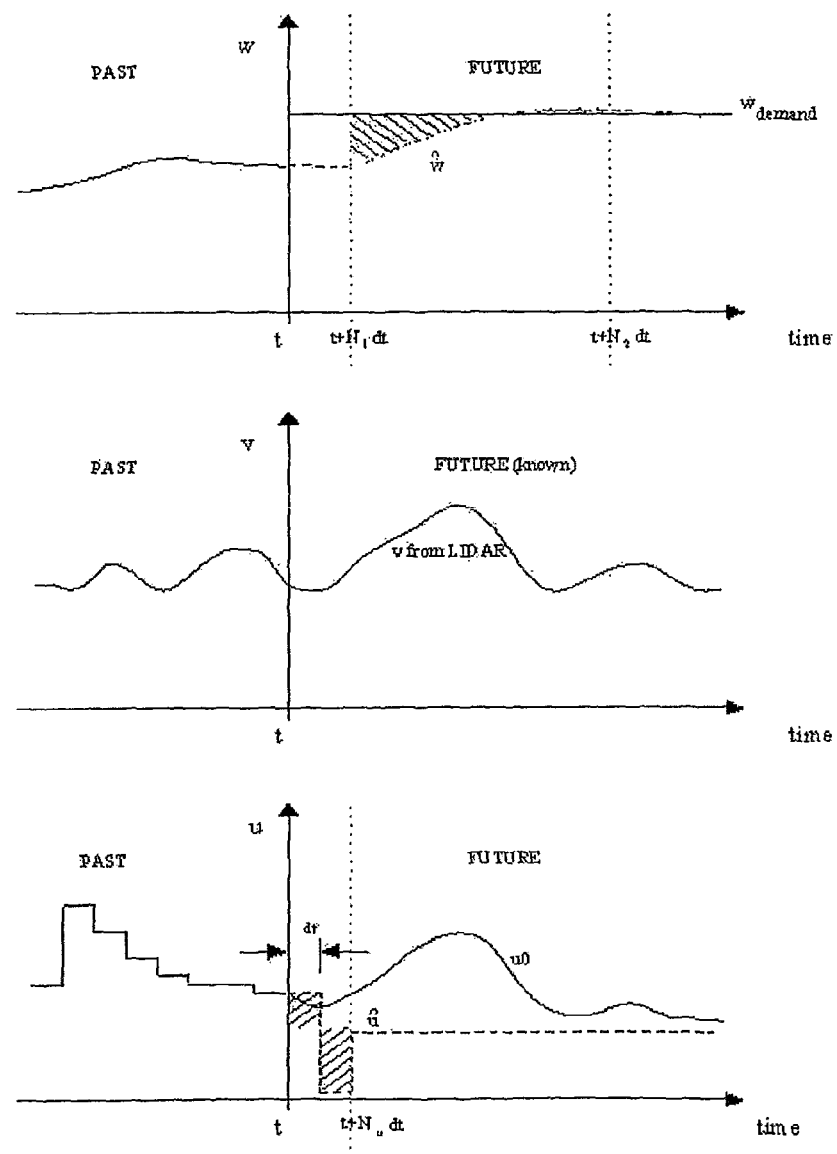
FIG. 7 shows a plurality of time series graphs for control parameters used in the control system.

FIG. 7 illustrates a time series plot of values for w, v and $u^{pitch}$. The top diagram shows the generator speed w as a function of time t. For the purposes of illustration it is assumed that at time t=0 the required generator speed $w_{demand}$ is set at a higher value than the current generator speed w. As a result, the generator speed must be increased over a future time period (in this case between t+$N_1$ dt and t+$N_2$ dt) by changing the pitch of the rotor blades. The predicted generator speed for the future period is indicated by ŵ (the rising dashed line on the graph). The difference in the predicted generator speed ŵ and required generator speed $w_{demand}$ is shown by the shaded region.

The data making up the middle diagram corresponds to a time graph of the wind speed. The current wind speed v at time t=0 is detected by an anemometer or wind sensor mounted on the wind turbine, while the future wind speed expected in future is obtained by LIDAR 26.

The bottom diagram shows time series adjustments to the pitch reference $u^{pitch}$. u0 is the optimal reference pitch value known from the Initial Controller 25. The horizontal dashed line is an assumed value of u that forms part of the calculation to be described later. In practice, the pitch reference is not held constant but is changed (usually by step wise values) so that the pitch value $u^{pitch}$ approximates the optimal value u0. The shaded area of the graph illustrates du (the difference between the optimal value of û and the step wise value of the control parameter u), which can be thought of as the relative cost of implementing the two changes in u that occur at different respective moments in time. This shaded area is taken into account in the later optimisation steps. Although, only two steps are shown, this is merely for clarity.

At each time t in a rolling time series t(i), the objective of the predictive controller 27 in FIG. 5 is to determine the best future sequence of pitch reference signals $u^{pitch}(i)$, that will drive the predicted generator speed $\hat{w}(i)$ to the required future set point $w_{demand}$. Thus, at each time point, the calculated pitch reference $u^{pitch}$ for t=0 can be transmitted as an output to the pitch controller to control the wind turbine blades. To achieve this, a receding horizon policy is used so that only the first value in the rolling time series (that is the present time t) is output. The control object is then reevaluated at each time sample as new information becomes available.

The prediction from Initial Controller 25 of u0 based on v, $u^{pitch}$ and the prediction of the future generator speed $\hat{w}$ are constantly updated, and it will be appreciated for each time instant, the calculated values of $u^{pitch}$ and $\hat{w}$ can be different across the rolling time period t(i) compared to their values across the time period calculated at a prior time instant.

Figure 6:
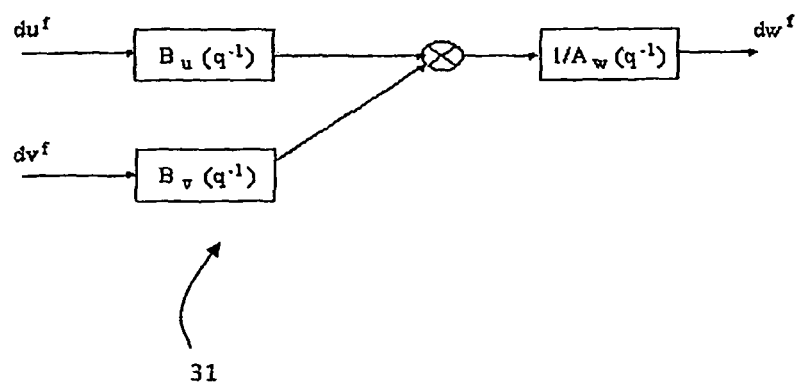
FIG. 6 is a schematic diagram of a predictive control model.

The success of the controller is very dependent on the quality of the predictions of $\hat{w}$. In this example, the prediction of $\hat{w}$ is carried out using a model by a linear Controlled Auto-Regressive Integrated Moving Average (CARIMA) model as shown in FIG. 6. The model comprises two inputs $du^f$ and $dv^f$, and one output $\hat{w}$. Here the superscript notation $d\{\ \}^f$ is used to indicate bandpass filtered quantities of the time sampled quantities u and v. In practice, where du and dv are expressed simply as the difference from t=(n-1) to t=n of successive samples in u and v, filtering is needed to remove high frequency or measurement noise. In this case, the filtering can be achieved using an expression of essentially $\Delta\{\ \}/T(q^{-1})$, where $q^{-1}$ is the backward shift operator, and T is a T filter of say $(1-0.8q^{-1})^2$. In practice this means that the current sampled value of u and v is constrained by mixing the current value with the 80% of the previous value, ensuring that sudden changes are avoided in the values received by the model 31.

A(q-1) and B(q-1) are pole and zero polynomials that are used to contain the coefficients of predictor difference equations. In the example described here, the polynomial coefficients are obtained using an (on-line or real time) Recursive Least Squares Estimator. The polynomial terms allow the predictive controller 27 to compensate for the strong interaction of the wind v on the generator speed w.

In one example, a Multiple Model Recursive Least-Squares (MMRLS) on-line parameter estimator is used as the adaptive control block 32 to update the CARIMA model coefficients. The output from the wind turbine in real time are passed to a subtractor 33, where the predicted value of $\hat{w}$ is subtracted from the actual value to give a real time prediction error. This is then fed to the MMRLS as inputs. The MMRLS block calculates the coefficients required to minimise the errors between the real time output of the wind turbine and the predicted value produced by the model. The advantage of employing a built-in estimator is that the model coefficients are identified in situ and the model is thus trained with representative closed-loop frequency data. This means that it is able to take into account the exact A/D and D/A scaling and performance, and can dynamically adapt to changes in the wind turbine system due to varying conditions and ageing.

There are two ways of using the continually updated MMRLS model coefficients: in self-tuning mode, the model coefficients identified on-line using MMRLS are only passed to the predictive controller once the operator is satisfied with the prediction quality, and in adaptive mode, the coefficients are passed to the controller at every sample point. Certification requirements might prevent fully adaptive systems, in which case, it is envisaged that the self-tuning approach might be most appropriate which will enable easy commissioning of the predictive controller.

For each time t, the predictive controller therefore receives from model 31 a predicted value of $\hat{w}$. The task of the predictive controller is then to calculate the time series values of u required for future control. The predictive controller calculates this time series by postulating a cost function given in terms of u as a variable, and then seeking to minimise this for all values of u over the future time period. The minimization can be performed by an Optimizer (optimising u with the condition that the cost function tends to a minimum), and an example approach will be described later.

It will be appreciated that the form of the cost function is therefore extremely important if the control of the wind turbine is to be carried out effectively.

Mathematically, the code of the predictive controller 27 therefore finds a set of $N_u$ of future control signals u(t+i), where $(0 \leq i \leq N_u)$ that minimise the following cost function at every sampling interval i (in this example $N_u$=5 was found to be sufficient, though if required $N_u$ could be equal to the number of values of v, namely 30):

$$J(t) = J(t)_{tracking} + J(t)_{activity} + J(t)_{steady\text{-}state}$$

This cost function is a summation of three terms. $J_{tracking}$ describes the individual costs of set point tracking errors in the generator speed w; $J_{activity}$ describes any control activity penalties, such as operational constraints to reduce activation and wear and tear of the pitch control actuators; and $J_{steady\text{-}state}$ describes the cost of cost of deviating from optimal steady state actuator parameters.

The individual terms will now be described in more detail. The tracking error is the difference between the predicted values of $\hat{w}$ and the required value of $w_{demand}$ as shown by the shaded area in the top graph of FIG. 7. It will be appreciated that it is desirable to have the predicted value tend to the required value as quickly as possible, and that differences in the two values can therefore be represented as a cost to be minimised. This is the primary driver in the optimisation process. Mathematically, the cost can be expressed as follows. The expression in the brackets is simply the difference in the two terms at each value of i in a summation of the time series values. The value is squared to give a magnitude of the difference, and avoid differences in sign cancelling the term to zero.

$$J_{tracking} = \sum_{i=N_1}^{N_2} (w^{demand}(t+i) - w^{predicted}(t+i))^2$$

The control activity cost represents the cost of controlling the wind turbine in terms of the wear and tear on the mechanical and electrical systems, as well as the desire to minimise unnecessary activation. This applies both to the pitch actuator mechanism, and to the power rating set for the generator.

The first expression in brackets below represents the change in power reference for the wind turbine generator between two successive time values. Similarly, the second expression in brackerts represents the change in pitch value between two successive time values. The constants $\rho^{power}$ and $\rho^{pitch}$ are respective measures of the extent to which the power reference and pitch reference are allowed to be adjusted. A value for $\rho$ of zero essentially indicates that there is no cost in changing the power or the pitch of the rotor blades, whereas a positive value of $\rho$ results in the term taking on an increasing cost in the control formulation.

$$J_{activity} = \rho^{Power} \cdot \sum_{i=0}^{N_u-1} (u^{Power}(t+i) - u^{Power}(t+i-1))^2 +$$

$$\rho^{Pitch} \cdot \sum_{i=0}^{N_u-1} (u^{Pitch}(t+i) - u^{Pitch}(t+i-1))^2$$

The final term in the cost function represents the difference between the predicted optimal power reference $u0^{power}$ and $u0^{pitch}$ and the pitch $u^{pitch}$ and power $u^{power}$ calculated by the model. It represents the understanding that values of u that are too different to the optimal values produced by the Initial Controllers 24 and 25 for the known instantaneous wind speed are unlikely to be optimal for the system, and therefore acts as a constraint on the calculation. In the bottom graph of FIG. 7 a starting point for the calculation is illustrated by the horizontal line û. The constant μ therefore represents the amount of freedom the model is allowed in deviating from the optimal value u0.

$$J_{steady-state} = \mu^{Power} \cdot \sum_{i=0}^{N_u-1} (u^{Power}(t+i) - u0^{Power}(t+i))^2 +$$

$$\mu^{Pitch} \cdot \sum_{i=0}^{N_u-1} (u^{Pitch}(t+i) - u0^{Pitch}(t+i))^2$$

The calculation is also subject to the following constraints:
a) magnitude $u_{min} < u < u_{max}$, and rate constraints $du_{min} < du < du_{max}$ on the proposed future control signals;
b) generator rpm output constraints $w_{min} < w < w_{max}$ These ensure that the u and w values remain within realistic parameters; and
c) auxiliary constraints such as Blade Root Bending Moments, Rotor Thrust, Tower Top acceleration, Tower Bottom Bending Moment, etc.

This represents other mechanical or electrical limitations on the system. The constraints are incorporated into the model by using a CARIMA model for each. For example, the Blade Root Bending Moment is modeled as a function of v and u in the same way as generator speed w, and the appropriate CARIMA model gives an output for the predicted Blade Root Bending Moment. In the optimising process, the optimiser then processes u with the additional constraint that the resulting Blade Root Bending Moment does not go above (or below) predetermined threshold values. This is an important feature of the model as it ensures that structural conditions of the wind turbine in terms of and forces, loads and strains, can be maintained within safe parameters. Examples of phenomenon that can be minimised by control of $u^{pitch}$ and $u^{power}$ in this way are damage due to excessive Blade Root Bending Moments, Rotor Thrust, and Tower Top acceleration, Tower Bottom Bending Moment or oscillation.

This cost function based approach is a very powerful methodology as it encapsulates the relative importance of the competing objectives in a straight forward way. For example, actuator oscillation can be dampened and hence wear reduced by increasing the ρ value; additionally, adjusting the μ weighting values from ∞ ($10^6$ in practice) to 0 allows smooth movement from traditional open loop or off-line map-based control to full transient on-line compensation. One point to note is that a setpoint tracking bias will be present in this cost function formulation if μ>0 and the steady-state map actuator values from the Initial controllers 24 and 25 do not correspond to the steady-state setpoints. Thus, care must be taken in choosing the cost function weightings to reflect confidence in the steady-state maps used by Initial Controllers 24 and 25 to lessen any bias inherent in the maps affecting operation.

Note also that in this implementation, the generator setpoint is assumed to be constant in the future, but if knowledge about future setpoint behaviour is available from the network or other control information, this can be easily incorporated into the cost function to yield even better transient performance.

We shall now describe the operation of the Optimiser in more detail. The output of the Optimiser is a time series of du(t) that minimises the Cost function J expressed above. It will be appreciated that each of the terms in J is dependent on u. Assuming that the modelling system operates without constraints (see example constraints mentioned above), the Optimiser can be implemented using a linear model. This affords an analytical solution to minimising the predictive control cost function, which is both reliable and fast to compute. In this example, the Optimiser function is of the Least-Squares form:

$$du(t) = (R^T R + \rho \cdot I)^{-1} R^T \epsilon$$

where du(t) are the future control actions (expressed relative to û), R is the dynamics matrix and ε is the future set-point tracking errors ($w_{demand} - \hat{w}$).

Where the model includes constraints, the equation is iterated using the Mixed Weights Least-Squares (MWLS) algorithm in order to satisfy the constraints to within a set tolerance. We have found that a tolerance of $10^{-8}$ and a maximum number of iterations set to 2000 is suitable for the functional testing. Both of these can be relaxed if required to reduce computational load. For non-linear models, general optimiser techniques should be used to solve for the control parameters u.

The linear model CARIMA model is used in the example implementation as it is easy and quick to use. The Optimiser could however make use of a non-linear model such as Non-linear ARX (auto-regressive with exogenous disturbance model), and NARMAX (non-linear auto-regressive with moving average and exogenous disturbance model), Hammerstein, Weiner and Volterra Models, Bi-linear models, neural networks, fuzzy sets, as well as FAST (Fatigue Aerodynamics and Structural Dynamics Model) and VTS codes (a proprietary turbine modelling code based on FLEX5 provided by Vestas). Where non-linear models are used, general optimiser techniques need to be used to solve for the control signals. Other implementations will be apparent to the skilled man, with the focus being the selection of a model structure that provides good predictions while being computationally tractable.

Figure 8:
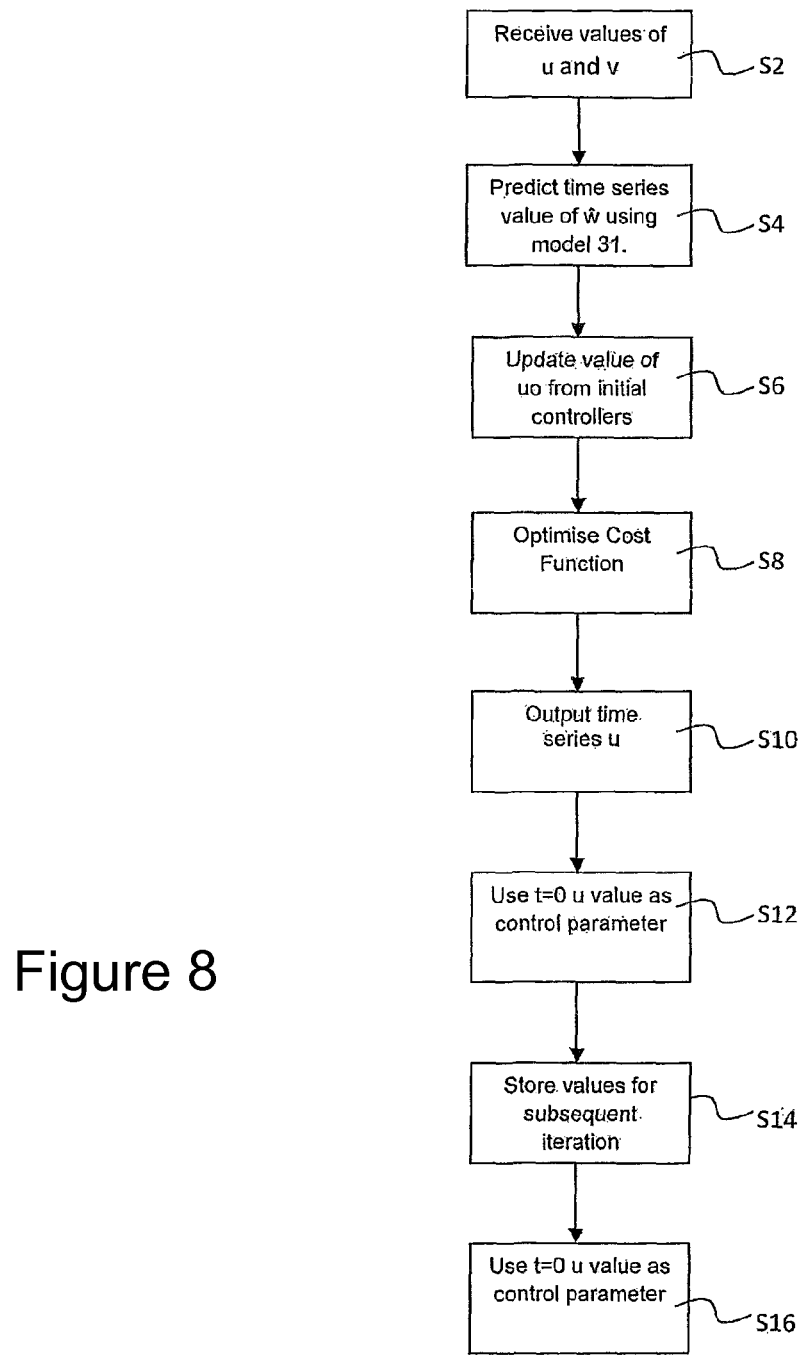
FIG. 8 is a flow chart illustrating an example of a control method.

Reference will now be made to FIG. 8, which provides a summary of the control method described in the above example. In step S2, the predictive controller 27 receives values of u and v for the current iteration of the method. v is the array of wind speed values received from the LIDAR 26, while u is a set of values of a control variable, corresponding to the same period in time as the current time window for the wind speed values v. It will be appreciated that the time series of values for u must be pre-generated by the predictive controller in the previous iteration of the method. In the very first iteration of the method, the time series of u can be set at an initial value, such as at the value predicted by the initial controllers 24 and 25 for the corresponding instantaneous wind speeds. In subsequent iterations of the method, the predictive controller 27 uses the time series of u that was optimised in the previous iteration.

In step S4, the predictive controller 27 then generates a time series for the predicted generator speed ŵ corresponding to the time window for v and u. In step S6, the instantaneous value of the wind speed is passed to the initial controllers 24 and 25 and, and the initial controllers output a reference value of u0 to the predictive controller 27. Step S6 is optional.

In Step S8, the cost function is minimised in the manner described above, and an optimised time series of values for u is calculated in Step S10 corresponding to the set of u values that minimise the cost function. In Step S12, the t=0 value for u is output by the predictive controller 27 to the wind turbine actuator system. In Step S14, the time series values for u and v are stored in memory in the predictive controller for use in subsequent steps. Step S16 is an optional step and is carried out if the model 31 is to be updated given the newly calculated time series values. In this step, the generator speed w is detected and fed into the adaptive control block 32 for the model to compare the predicted value of ŵ to the actual value.

The method illustrated in FIG. 8 will then be repeated for the next time instant and the time series will be updated to remove the t=0 value and add a new data point for the last value in the array.

In the example described above, the tracking error is based solely on the difference between the predicted and requested generator speeds. However, it is possible to track errors in other variables, either separately or in combination, and use these as set points in the cost reduction function for $J_{tracking}$. Suitable tracking error variables include those used as the constraints in the steady state expression, namely Blade Root Bending Moments, Rotor Thrust, Tower Top acceleration, Tower Bottom Bending Moment and so on. In an example where at least Generator Speed w and Blade Root Bending Moment v are used as set points, the $J_{tracking}$ function can be written:

$$J_{tracking} = \gamma_1 \sum_{i=N_1}^{N_2} (w^{demand}(t+i) - w^{predicted}(t+i))^2 + \gamma_2 \sum_{i=N_1}^{N_2} (v^{demand}(t+i) - v^{predicted}(t+i))^2 + \ldots$$

The coefficients $\gamma_1$ and $\gamma_2$ allow each set point tracking error to be given a weighting, and therefore included in the tracking error function or omitted. For example, in the above expression, if $\gamma_2$ and any subsequent coefficients are set to zero, while $\gamma_1$ is non zero, the expression reduces to that for the case where only the difference in generator speeds is considered.

We have also identified that it is particularly useful to incorporate differences in the Blade Root Bending Moment. Those skilled in the art will appreciate that it is desirable to maintain Blade Root Bending Moment within set parameters according to load and pitch control instructions. The result of optimising the cost function according to this parameter will be optimised generator and/or pitch control signals for output as before. It is possible in an alternative embodiment to calculate the tracking error based solely on blade root bending moment in which case generator speed must be separately constrained.

In one embodiment, the predictive controller can be used as a diagnostic tool. As the model 31 is constantly being updated in order to predict future values of generator speed, pitch control and power control reference values, it is possible to identify situations in which the wind turbine is not operating correctly. This could be achieved by comparing the predicted values calculated by the model for the control purposes with values that are representative of normal operation conditions. In this embodiment the output from the predictive controller 27 and model 31 is fed to memory 34 and classifier 35 which is arranged to interpret the data and indicate to the network 16 the nature of any fault that is detected. Identifying a fault in this way, may be achieved by comparing the data with threshold values, pattern matching or any other known mathematical techniques.

The example described above uses a cost function that takes into account both the pitch and power control, but as noted in the text it would be possible to implement a more simple system in which only one or the other of the references is used. Furthermore, it will be appreciated that the predictive controller can be incorporated in one or more of both partial and full load control.

Although an example of the invention has been described using a LIDAR system it will be appreciated that any wind sensor system that detects the incident wind at an appropriate position or distance in front of the wind turbine could be used. One such example is a mast mounted anemometer, as well as other doppler anemometer apparatus such as SODAR and RADAR. LIDAR apparatus are however preferred as they can be easily installed for each individual wind turbine and offer a quick and reliable sensing method.

The invention claimed is:

1. A wind turbine comprising:
   one or more rotor blades;
   a pitch actuator system for adjusting the pitch angle of the one or more wind turbine rotor blades;
   a generator;
   a wind sensor for detecting an incident wind speed at a predetermined distance in front of the one or more rotor blades; and
   a controller coupled to the wind sensor for providing an output control signal for the wind turbine, wherein the controller is arranged to:
   a) receive values from the wind sensor indicating the incident wind speed at the predetermined distance in front of the wind turbine;
   b) generate a time series representation of the incident wind speed for a future time period;
   c) postulate a time series of values for an output control signal for a future time period;
   d) optimise the time series of values for the output control signal based on minimising a cost function, wherein the cost function includes terms defining aspects of the operation of the wind turbine; and
   e) output a control signal based on the time series of values optimised in step d).

2. The wind turbine of claim 1, wherein the output control signal is a blade pitch reference signal output to the pitch actuation system.

3. The wind turbine of claim 1, wherein the output control signal is a generator power reference output to the generator.

4. The wind turbine of claim 1, wherein the cost function contains a term representing the difference between a time series representation of the required speed of the generator, and a future time series representation of the predicted generator speed.

5. The wind turbine of claim 4, wherein the time series representation of the predicted generator speed is calculated based on the time series representation of the incident wind speed for a future time period, and the time series values of the control signal.

6. The wind turbine of claim 1, wherein the cost function contains a term representing the difference between a time series representation of the desired blade root bending moment, and a future time series representation of the predicted blade root bending moment.

7. The wind turbine of claim 1, wherein the cost function contains a term representing the extent to which changes in the value of the control signal are permitted.

8. The wind turbine of claim 1, wherein the controller is arranged to receive one or more optimal reference values for the control signal, based on a measured wind speed at the wind turbine.

9. The wind turbine of claim 8, wherein the cost function contains a term representing the extent to which the time series of values for the output control signal once optimised are permitted to differ from the optimal reference values.

10. The wind turbine of claim 1, wherein the wind sensor is a doppler anemometer.

11. A method of controlling a wind turbine, the wind turbine having one or more rotor blades, a pitch actuator system for adjusting the pitch angle of the one or more wind turbine rotor blades, a generator; a wind sensor for detecting the incident wind speed at a predetermined distance in front of the one or more rotor blades, and a controller coupled to the wind sensor for providing an output control signal for the wind turbine, the method comprising at the controller:
   a) receiving values from the wind sensor indicating the incident wind speed at the predetermined distance in front of the wind turbine;
   b) generating a time series representation of the incident wind speed for a future time period;
   c) postulating a time series of values of an output control signal for a future time period;
   d) optimising the time series of values for the output control signal based on minimising a cost function, wherein the cost function includes terms defining aspects of the operation of the wind turbine; and
   e) outputting a control signal based on the time series of values optimised in step d).

12. The method of claim 11, comprising outputting as a control signal a blade pitch reference signal to control the pitch actuation system.

13. The method of claim 11, comprising outputting as a control signal a generator power reference output to control the generator.

14. The method of claim 11, wherein the cost function contains a term representing the difference between a time series representation of the required speed of the generator, and a future time series representation of the predicted generator speed.

15. The method of claim 14, wherein the time series representation of the predicted generator speed is calculated based on the time series representation of the incident wind speed for a future time period, and the time series values of the control signal.

16. The method of claim 11, wherein the cost function contains a term representing the difference between a time series representation of the desired blade root bending moment, and a future time series representation of the predicted blade root bending moment.

17. The method of claim 11, wherein the cost function contains a term representing the extent to which changes in the value of the control signal are permitted.

18. The method of claim 17, wherein the cost function contains a term representing the extent to which the time series of values for the output control signal once optimised are permitted to differ from the optimal reference values.

19. The method of claim 11, comprising, at the controller, receiving one or more optimal reference values for the control signal, based on a measured wind speed at the wind turbine.

20. The method of claim 11, wherein the wind sensor is a Doppler anemometer.

21. An apparatus for controlling the operation of a wind turbine, the wind turbine comprising: one or more rotor blades; a pitch actuator system for adjusting the pitch angle of the one or more wind turbine rotor blades; a generator; and a wind sensor for detecting the incident wind speed at a predetermined distance in front of the one or more rotor blades; the apparatus comprising:
   a controller coupled to the wind sensor for providing an output control signal for the wind turbine, wherein the controller is arranged to:
      a) receive values from the wind sensor indicating the incident wind speed at the predetermined distance in front of the wind turbine;
      b) generate a time series representation of the incident wind speed for a future time period;
      c) postulate a time series of values for an output control signal for a future time period;
      d) optimise the time series of values for the output control signal based on minimising a cost function, wherein the cost function includes terms defining aspects of the operation of the wind turbine; and
      e) output a control signal based on the time series of values optimised in step d).

22. A computer program product containing computer code for controlling a wind turbine, the wind turbine having one or more rotor blades, a pitch actuator system for adjusting the pitch angle of the one or more wind turbine rotor blades, a generator; a wind sensor for detecting the incident wind speed at a predetermined distance in front of the one or more rotor blades, and a controller coupled to the wind sensor for providing an output control signal for the wind turbine, wherein the computer program product is executable on a computer to:
   receive values from the wind sensor indicating the incident wind speed at the predetermined distance in front of the wind turbine;
   generate a time series representation of the incident wind speed for a future time period;
   postulate a time series of values of an output control signal for a future time period;
   optimize the time series of values for the output control signal based on minimizing a cost function, wherein the cost function includes terms defining aspects of the operation of the wind turbine; and
   output a control signal based on the optimized time series of values.

* * * * *